United States Patent
Li

(10) Patent No.: US 11,962,365 B2
(45) Date of Patent: Apr. 16, 2024

(54) DATA TRANSMISSION METHOD AND APPARATUS

(71) Applicant: TENDYRON CORPORATION, Beijing (CN)

(72) Inventor: Dongsheng Li, Beijing (CN)

(73) Assignee: TENDYRON CORPORATION, Beijing (CN)

( * ) Notice: Subject to any disclaimer, the term of this patent is extended or adjusted under 35 U.S.C. 154(b) by 0 days.

(21) Appl. No.: 17/984,253

(22) Filed: Nov. 10, 2022

(65) Prior Publication Data

US 2023/0073305 A1 Mar. 9, 2023

Related U.S. Application Data

(63) Continuation of application No. PCT/CN2021/102270, filed on Jun. 25, 2021.

(30) Foreign Application Priority Data

Jul. 29, 2020 (CN) .......................... 202010744998.1

(51) Int. Cl.
*H04B 3/54* (2006.01)
*H04L 1/16* (2023.01)
(Continued)

(52) U.S. Cl.
CPC .......... *H04B 3/542* (2013.01); *H04L 1/1607* (2013.01); *H04L 27/2067* (2013.01)

(58) Field of Classification Search
CPC ............... H04L 27/2067; H04L 1/1607; H04L 2001/125; H04B 3/542; Y02D 30/70
See application file for complete search history.

(56) References Cited

U.S. PATENT DOCUMENTS

| 6,954,800 B2 | 10/2005 | Mallory |
| 2008/0049600 A1 | 2/2008 | Liu |

(Continued)

FOREIGN PATENT DOCUMENTS

| CN | 101305608 A | 11/2008 |
| CN | 101584144 A | 11/2009 |

(Continued)

OTHER PUBLICATIONS

The Grant Notice from corresponding Chinese Application No. 202010744998.1, dated Mar. 30, 2023. English translation attached.

(Continued)

*Primary Examiner* — Aristocratis Fotakis

(57) ABSTRACT

The present disclosure provides a data transmission method and apparatus. The method includes: obtaining to-be-transmitted data; putting the to-be-transmitted data into a to-be-transmitted data field with a fourth predetermined number of Bytes in a first predetermined frame format for encapsulation, to obtain a to-be-transmitted data frame, the first predetermined frame format sequentially including a first permeable field, a frame synchronization signal field, an address field, the to-be-transmitted data field, a check field, a first postamble field, and a first predetermined gap field; encoding and modulating the to-be-transmitted data frame in accordance with BPSK, and then transmitting the to-be-transmitted data frame; and demodulating and decoding in accordance with the BPSK to obtain an ACK signal.

2 Claims, 2 Drawing Sheets

(51) Int. Cl.
  *H04L 1/1607* (2023.01)
  *H04L 27/20* (2006.01)

(56) References Cited

U.S. PATENT DOCUMENTS

| | | |
|---|---|---|
| 2008/0186944 A1 | 8/2008 | Suzuki et al. |
| 2008/0240031 A1 | 10/2008 | Nassiri-Toussi et al. |
| 2008/0304577 A1 | 12/2008 | Koga et al. |
| 2009/0323571 A1* | 12/2009 | Arvind .................. H04L 1/0083 370/311 |
| 2011/0074552 A1 | 3/2011 | Norair et al. |
| 2012/0093198 A1 | 4/2012 | Dabak et al. |
| 2014/0036904 A1* | 2/2014 | Mutou .............. H04W 56/0015 370/350 |
| 2014/0241441 A1 | 8/2014 | Devaucelle |
| 2014/0269263 A1* | 9/2014 | Zeng ....................... H04L 45/66 370/228 |
| 2018/0212684 A1 | 7/2018 | Aoyama et al. |
| 2019/0268072 A1 | 8/2019 | Aoyama et al. |
| 2022/0182193 A1* | 6/2022 | Im ........................ H04L 5/0055 |
| 2022/0353054 A1* | 11/2022 | Yoshizawa .......... H04W 56/001 |

FOREIGN PATENT DOCUMENTS

| | | | |
|---|---|---|---|
| CN | 105103460 | A | 11/2015 |
| CN | 107113058 | A | 8/2017 |
| CN | 107346997 | A | 11/2017 |
| CN | 108141318 | A | 6/2018 |
| CN | 109951252 | A | 6/2019 |
| CN | 111917514 | A | 11/2020 |
| EP | 3160072 | A1 | 4/2017 |
| JP | 60246065 | A | 12/1985 |
| JP | 62291232 | A | 12/1987 |
| JP | 2001197146 | A | 7/2001 |
| JP | 2002314504 | A | 10/2002 |
| JP | 2004201065 | A | 7/2004 |
| JP | 2009194704 | A | 8/2009 |
| JP | 2016513382 | A | 5/2016 |
| KR | 20190029062 | A | 3/2019 |

OTHER PUBLICATIONS

International Search Report dated Sep. 28, 2021 in International Application No. PCT/CN2021/102270. English translation attached.
First Office Action from corresponding Chinese Application No. 202010744998.1 dated Nov. 4, 2022. English translation attached.
Wei Cai, "The design and implement ation for the protocol stack of linear long-distance wireless sensor network", «Full Database of the Chinese Master Thesis» , Aug. 15, 2012, (Aug. 15, 2012).
Zicheng Pei, "Design and Implementation of DSRC Communication Protocol Based on Embedded Linux", «Full Database of the Chinese Master Thesis» , Jul. 15, 2012, (Jul. 15, 2012).
Extended European Search Report from corresponding European Application No. EP21849106.6, dated Dec. 19, 2023.
Xudong Wang et al.:"Analog network coding without restrictions on superimposed frames" IEEE /ACM Transactions on Networking, IEEE/ ACM, New York, NY, US, vol. 24, No. 2, Apr. 1, 2016 (Apr. 1, 2016), pp. 788-805, XP058282410.
First Office Action dated Jan. 30, 2024 received in corresponding patent family application No. JP2023-505399. English translation attached.
Ericsson, "Ethernet Header Compression" 3GPP TSG-RAN WG2 #103bis Tdoc R2-1814811, Oct. 8, 2018.

\* cited by examiner

| Pre-porch | SOF | Address | Data | CRC | Post-porch | Gap | ated data frame in accordance with BPSK, and then transmit the to-be-transmitted data frame. The first predetermined number of Bytes is 2 Bytes, the second predetermined number of Bytes is 2 Bytes, the third predetermined number of Bytes is 1 Byte, the fourth predetermined number of Bytes ranges from 1 Byte to 512 Bytes, the fifth predetermined number of Bytes is 2 Bytes, the sixth predetermined number of Bytes is 1 Byte, and the first predetermined gap field is a gap greater than or equal to 3.2 us. The frame synchronization signal is 0xFFF0. The receiving module is configured to receive an ACK frame in a second predetermined format, the second predetermined format sequentially including: a second preamble field with a seventh predetermined number of Bytes, an ACK signal field with an eighth predetermined number of Bytes, a second postamble field with a ninth predetermined number of Bytes, and a second predetermined gap field; and demodulate and decode in accordance with the BPSK to obtain an ACK signal. The seventh predetermined number of Bytes is 2 Bytes, the eighth predetermined number of Bytes is 2 Bytes, the ninth predetermined number of Bytes is 1 Byte, and the second predetermined gap field is a gap greater than or equal to 3.2 us. The ACK signal is 0xFFF0.

DATA TRANSMISSION METHOD AND APPARATUS

CROSS REFERENCE TO RELATED APPLICATIONS

The present application is a continuation of International Application No. PCT/CN2021/102270, filed on Jun. 25, 2021, which claims priority to Chinese Patent Application No. "202010744998.1" filed on Jul. 29, 2020 by TENDYRON CORPORATION and entitled "Data Transmission Method and Apparatus", the entire content of which is incorporated herein by reference.

TECHNICAL FIELD

The present disclosure relates to the field of communications, and more particularly, to a data transmission method and apparatus.

BACKGROUND

Power Line Communication (PLC), with the full name as Power Line Carrier Communication, refers to a special communication mode for voice or data transmission by using a high-voltage power line (generally referred to as a voltage level of 35 kV and above in the field of power line carrier), a medium-voltage power line (referred to as a voltage level of 10 kV), a low-voltage distribution line (a subscriber line of 380/220V) or a direct current 12V/24/36V as an information transmission medium.

However, the existing power line communication modes are not stable enough and often make mistakes due to the noise problem, and thus the existing power line communication modes cannot be applied to large data transmission.

SUMMARY

An aspect of the present disclosure provides a data transmission method. The data transmission method includes: obtaining to-be-transmitted data; putting the to-be-transmitted data into a to-be-transmitted data field with a fourth predetermined number of Bytes in a first predetermined frame format for encapsulation, to obtain a to-be-transmitted data frame, the first predetermined frame format sequentially including a first preamble field with a first predetermined number of Bytes, a frame synchronization signal field with a second predetermined number of Bytes, an address field with a third predetermined number of Bytes, the to-be-transmitted data field with the fourth predetermined number of Bytes, a check field with a fifth predetermined number of Bytes, a first postamble field with a sixth predetermined number of Bytes, and a first predetermined gap field; and encoding and modulating the to-be-transmitted data frame in accordance with BPSK, and then transmitting the to-be-transmitted data frame. The first predetermined number of Bytes is 2 Bytes, the second predetermined number of Bytes is 2 Bytes, the third predetermined number of Bytes is 1 Byte, the fourth predetermined number of Bytes ranges from 1 Byte to 512 Bytes, the fifth predetermined number of Bytes is 2 Bytes, the sixth predetermined number of Bytes is 1 Byte, and the first predetermined gap field is a gap greater than or equal to 3.2 us. The frame synchronization signal is 0xFFF0. The method further includes: receiving an ACK frame in a second predetermined format, the second predetermined format sequentially including: a second preamble field with a seventh predetermined number of Bytes, an ACK signal field with an eighth predetermined number of Bytes, a second postamble field with a ninth predetermined number of Bytes, and a second predetermined gap field; and demodulating and decoding in accordance with the BPSK to obtain an ACK signal. The seventh predetermined number of Bytes is 2 Bytes, the eighth predetermined number of Bytes is 2 Bytes, the ninth predetermined number of Bytes is 1 Byte, and the second predetermined gap field is an gap greater than or equal to 3.2 us. The ACK signal is 0xFFF0.

Another aspect of the present disclosure provides a data transmission apparatus. The apparatus includes: a transmitting module and a receiving module. The transmitting module is configured to obtain to-be-transmitted data; put the to-be-transmitted data into a to-be-transmitted data field with a fourth predetermined number of Bytes in a first predetermined frame format for encapsulation, to obtain a to-be-transmitted data frame, the first predetermined frame format sequentially including a first preamble field with a first predetermined number of Bytes, a frame synchronization signal field with a second predetermined number of Bytes, an address field with a third predetermined number of Bytes, the to-be-transmitted data field with the fourth predetermined number of Bytes, a check field with a fifth predetermined number of Bytes, a first postamble field with a sixth predetermined number of Bytes, and a first predetermined gap field; encode and modulate the to-be-transmit- It can be seen from the above-mentioned technical solution provided by the present disclosure that, by means of the data transmission method and apparatus provided by the embodiments of the present disclosure, fast and stable data communication can be performed on a power line with low cost.

DESCRIPTION OF EMBODIMENTS

Hereinafter, embodiments of the present disclosure will be described in detail with reference to the accompanying drawings.

Figures 1, 2:
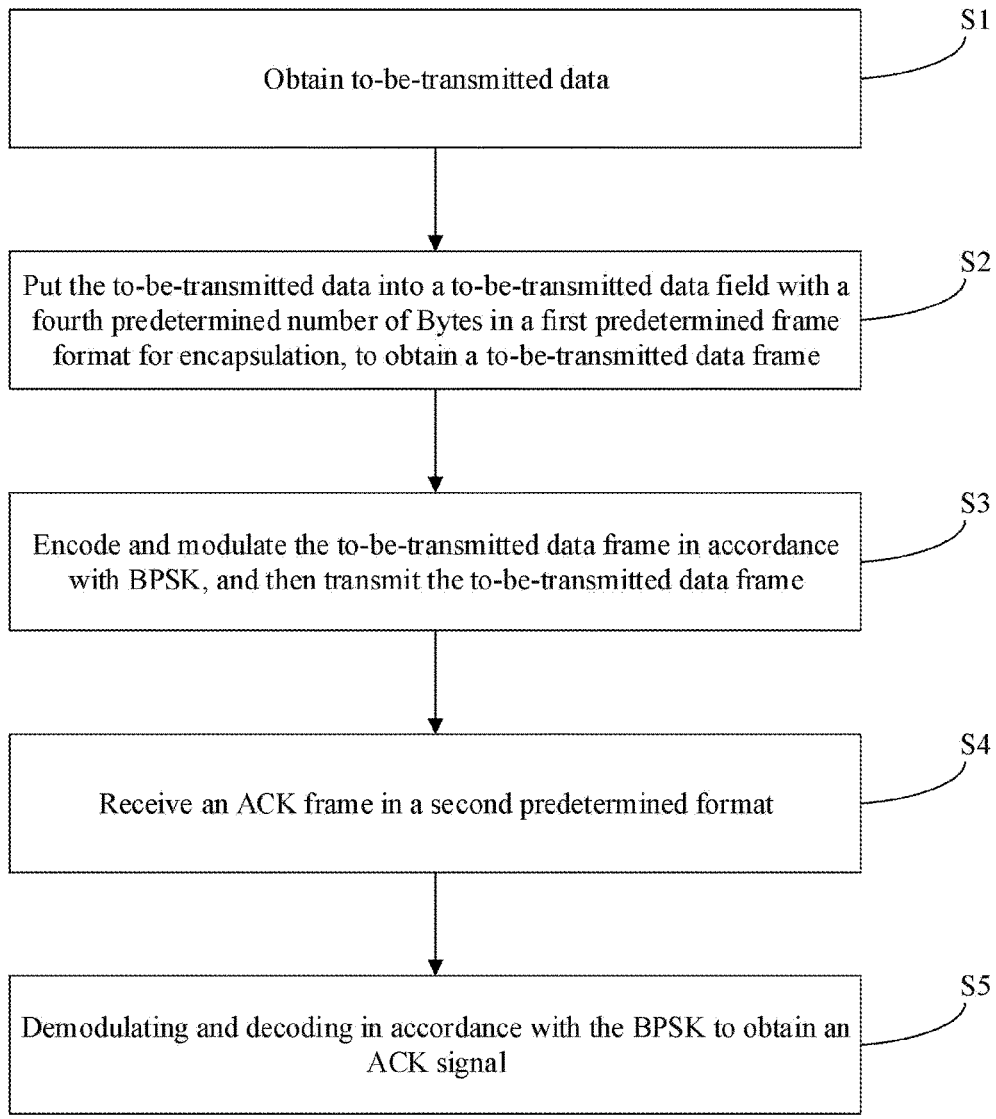
FIG. 1 is a flowchart of a data transmission method provided by an embodiment of the present disclosure.
FIG. 2 is a schematic diagram of a first predetermined frame format provided by an embodiment of the present disclosure.

FIG. 1 illustrates a flow chart of a data transmission method provided by an embodiment of the present disclosure. Referring to FIG. 1, a data transmission method provided by an embodiment of the present disclosure includes the following steps.

At step S1, to-be-transmitted data is obtained.

Specifically, the data transmission method provided by the present disclosure can be applied to the field of power line data communication, and data communication via a power line.

The content of the to-be-transmitted data can be determined according to actual needs, for example, instructions, data, etc. and this is not particularly limited in the present disclosure. The length of the to-be-transmitted data can also be determined according to actual needs.

At step S2, the to-be-transmitted data is input into a to-be-transmitted data field with a fourth predetermined Bytes in a first predetermined frame format for encapsulation, to obtain a to-be-transmitted data frame. The first predetermined frame format sequentially includes a first preamble field with a first predetermined number of Bytes, a frame synchronization signal field with a second predetermined number of Bytes, an address field with a third predetermined number Bytes, the to-be-transmitted data field with the fourth predetermined number of Bytes, a check field with a fifth predetermined number of Bytes, a first postamble field with a sixth predetermined number of Bytes, and a first predetermined gap field.

With reference to FIG. 2, the first predetermined frame format provided by the present disclosure is described. The first predetermined frame format provided by the present disclosure sequentially includes a preamble field, a frame synchronization signal field, an address field, a to-be-transmitted data field, a check field, a postamble field and an gap field.

Herein, the preamble field is configured to reduce a noise when conducting. The frame synchronization signal field is configured to indicate a start of a data frame and/or provide a standard for subsequently receiving a data frame. The address field is configured to identify a source address and a destination address for frame transmission. The to-be-transmitted data field is a data field with a variable length and is configured to accommodate the to-be-transmitted data. The check field is configured to check the integrity of the data frame. The postamble field is configured to isolate a noise on the power line. The gap field is configured to distinguish two data frames so that processing time can be given to a receiving terminal.

As an alternative embodiment of an embodiment of the present disclosure, the first predetermined number of Bytes is 2 Bytes, the second predetermined number of Bytes is 2 Bytes, the third predetermined number of Bytes is 1 Byte, the fourth predetermined number of Bytes ranges from 1 Byte to 512 Bytes, the fifth predetermined number of Bytes is 2 Bytes, the sixth predetermined number of Bytes is 1 Byte, and the first predetermined gap field is a gap greater than or equal to 3.2 us. The frame synchronization signal is 0xFFF0.

The preamble may be a monocycle waveform with a time of 2 Bytes, and the postamble may be a monocycle signal with a time 1 Byte. Of course, the specific Bytes can be determined according to actual needs.

Of course, the above field with a number of Bytes can also be determined according to actual needs. The predetermined gap field can also be set to any gap greater than or equal to 3.2 us according to actual needs.

At step S3, the to-be-transmitted data frame is encoded and modulated in accordance with BPSK, and then the to-be-transmitted data frame is transmitted.

Specifically, the encapsulated to-be-transmitted data frame is encoded and modulated in accordance with the BPSK and then transmitted via the power line.

As an alternative to the embodiment of the present disclosure, the data transmission method provided by the embodiment of the present disclosure further includes the following steps.

At step S4, an ACK frame in a second predetermined format is received. The second predetermined format sequentially includes: a second preamble field with a seventh predetermined number of Bytes, an ACK signal field with an eighth predetermined number of Bytes, a second postamble field with a ninth predetermined number of Bytes, and a second predetermined gap field.

After transmitting the data frame, the ACK frame transmitted by a peer device can also be received, and the ACK frame is configured to respond to the above-mentioned to-be-transmitted data frame.

Figure 3:
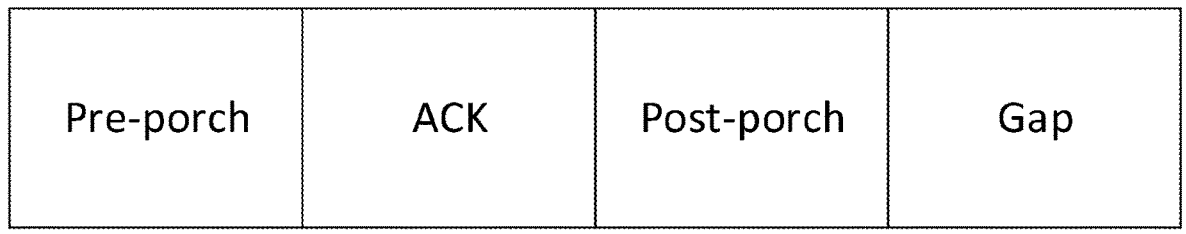
FIG. 3 is a schematic diagram of a second predetermined frame format provided by an embodiment of the present disclosure.

The second predetermined frame format provided by the present disclosure is described with reference to FIG. 3. The second predetermined frame format provided by the present disclosure sequentially includes a preamble field, an ACK signal field, a postamble field and an gap field.

Herein, the preamble field is configured to reduce a noise when conducting. The ACK signal field is configured to respond to the to-be-transmitted data frame. The postamble field is configured to isolate a noise on the power line. The gap field is configured to distinguish two data frames so that processing time can be given to a receiving terminal.

As an alternative embodiment of an embodiment of the present disclosure, the seventh predetermined number of Bytes is 2 Bytes, the eighth predetermined number of Bytes is 2 Bytes, the ninth predetermined number of Bytes is 1 Byte, and the second predetermined gap field is an gap greater than or equal to 3.2 us. The ACK signal is 0xFFF0.

The preamble may be a monocycle waveform with a time of 2 Bytes, and the postamble may be a monocycle signal with a time of 1 Bytes. Of course, the specific Bytes can be determined according to actual needs.

Of course, the above field with a number of Bytes can also be determined according to actual needs. The predetermined gap field can also be set to any gap greater than or equal to 3.2 us according to actual needs.

At step S5, demodulation and decoding are performed in accordance with the BPSK to obtain an ACK signal.

Specifically, after receiving the ACK data frame, the demodulation and decoding are performed in accordance with the BPSK to obtain the ACK signal.

It can be seen therefrom that, by means of the data transmission method provided by the embodiments of the present disclosure, fast and stable data communication can be performed on a power line with low cost.

A data transmission apparatus according to an embodiment of the present disclosure, which is applied to the above-mentioned method, is described below. A brief description of the structure of the data transmission apparatus is provided below. For other matters not mentioned above, reference is made to the above-mentioned description of the data transmission method. The data transmission apparatus according to the embodiment of the present disclosure includes a transmitting module and a receiving module.

The transmitting module is configured to obtain to-be-transmitted data; put the to-be-transmitted data into a to-be-transmitted data field with a fourth predetermined number of Bytes in a first predetermined frame format for encapsulation, to obtain a to-be-transmitted data frame, the first predetermined frame format sequentially including a first preamble field with a first predetermined number of Bytes, a frame synchronization signal field with a second predetermined number of Bytes, an address field with a third predetermined number of Bytes, the to-be-transmitted data field with the fourth predetermined number of Bytes, a check field with a fifth predetermined number of Bytes, a first postamble field with a sixth predetermined Bytes, and a first predetermined gap field; and encode and modulate the to-be-transmitted data frame in accordance with BPSK, and then transmit the to-be-transmitted data frame. The first predetermined number of Bytes is 2 Bytes, the second predetermined number of Bytes is 2 Bytes, the third predetermined number of Bytes is 1 Byte, the fourth predetermined number of Bytes ranges from 1 Byte to 512 Bytes, the fifth predetermined number of Bytes is 2 Bytes, the sixth predetermined number of Bytes is 1 Byte, and the first predetermined gap field is a gap greater than or equal to 3.2 us. The frame synchronization signal is 0xFFF0.

The receiving module is configured to receive an ACK frame in a second predetermined format, the second predetermined format sequentially including: a second preamble field with a seventh predetermined number of Bytes, an ACK signal field with an eighth predetermined number of Bytes, a second postamble field with a ninth predetermined number of Bytes, and a second predetermined gap field; and demodulate and decode in accordance with the BPSK to obtain an ACK signal. The seventh predetermined number of Bytes is 2 Bytes, the eighth predetermined number of Bytes is 2 Bytes, the ninth predetermined number of Bytes is 1 Byte, and the second predetermined gap field is a gap greater than or equal to 3.2 us. The ACK signal is 0xFFF0.

It can be seen therefrom that, by means of the data transmission apparatus provided by the embodiments of the present disclosure, fast and stable data communication can be performed on a power line with low cost.

While embodiments of the present disclosure have been shown and described, it should be understood that the above-described embodiments are illustrative and not restrictive, and that changes, modifications, substitutions and alterations may be made by those skilled in the art without departing from the principles and spirit of the disclosure. It is intended that the scope of the disclosure be defined by the claims appended hereto and their equivalents.

What is claimed is:

1. A data transmission method, comprising:
obtaining to-be-transmitted data;
putting the to-be-transmitted data into a to-be-transmitted data field with a fourth predetermined number of Bytes in a first predetermined frame format for encapsulation, to obtain a to-be-transmitted data frame, the first predetermined frame format sequentially comprising a first preamble field with a first predetermined number of Bytes, a frame synchronization signal field with a second predetermined number of Bytes, an address field with a third predetermined number of Bytes, the to-be-transmitted data field with the fourth predetermined number of Bytes, a check field with a fifth predetermined number of Bytes, a first postamble field with a sixth predetermined number of Bytes, and a first predetermined gap field; and
encoding and modulating the to-be-transmitted data frame in accordance with BPSK, and then transmitting the to-be-transmitted data frame,
wherein the first predetermined number of Bytes is 2 Bytes, the second predetermined number of Bytes is 2 Bytes, the third predetermined number of Bytes is 1 Byte, the fourth predetermined number of Bytes ranges from 1 Byte to 512 Bytes, the fifth predetermined number of Bytes is 2 Bytes, the sixth predetermined number of Bytes is 1 Byte, and the first predetermined gap field is a gap greater than or equal to 3.2 us; and the frame synchronization signal is 0xFFF0, and
wherein the method further comprises:
receiving an ACK frame in a second predetermined format, the second predetermined format sequentially comprising: a second preamble field with a seventh predetermined number of Bytes, an ACK signal field with an eighth predetermined number of Bytes, a second postamble field with a ninth predetermined number of Bytes, and a second predetermined gap field; and
demodulating and decoding in accordance with the BPSK to obtain an ACK signal,
wherein the seventh predetermined number of Bytes is 2 Bytes, the eighth predetermined number of Bytes is 2 Bytes, the ninth predetermined number of Bytes is 1 Byte, and the second predetermined gap field is a gap greater than or equal to 3.2 us; and the ACK signal is 0xFFF0.

2. A data transmission apparatus, comprising:
a transmitter configured to obtain to-be-transmitted data; put the to-be-transmitted data into a to-be-transmitted data field with a fourth predetermined number of Bytes in a first predetermined frame format for encapsulation, to obtain a to-be-transmitted data frame, the first predetermined frame format sequentially comprising a first preamble field with a first predetermined number of Bytes, a frame synchronization signal field with a second predetermined number of Bytes, an address field with a third predetermined number of Bytes, the to-be-transmitted data field with the fourth predetermined number of Bytes, a check field with a fifth predetermined number of Bytes, a first postamble field with a sixth predetermined number of Bytes, and a first predetermined gap field; and encode and modulate the to-be-transmitted data frame in accordance with BPSK, and then transmit the to-be-transmitted data frame, wherein the first predetermined number of Bytes is 2 Bytes, the second predetermined number of Bytes is 2 Bytes, the third predetermined number of Bytes is 1 Byte, the fourth predetermined number of Bytes ranges from 1 Byte to 512 Bytes, the fifth predetermined number of Bytes is 2 Bytes, the sixth predetermined Bytes is 1 Byte, and the first predetermined gap field is a gap greater than or equal to 3.2 us; and the frame synchronization signal is 0xFFF0;
a receiver configured to receive an ACK frame in a second predetermined format, the second predetermined format sequentially comprising: a second preamble field with a seventh predetermined number of Bytes, an ACK signal field with an eighth predetermined number of Bytes, a second postamble field with a ninth predetermined number of Bytes, and a second predetermined gap field; and demodulate and decode in accordance with the BPSK to obtain an ACK signal, wherein the seventh predetermined number of Bytes is 2 Bytes, the eighth predetermined number of Bytes is 2 Bytes, the ninth predetermined number of Bytes is 1 Byte, and the second predetermined gap field is a gap greater than or equal to 3.2 us; and the ACK signal is 0xFFF0.

* * * * *